United States Patent
Berent et al.

(10) Patent No.: US 9,347,758 B2
(45) Date of Patent: May 24, 2016

(54) APPARATUS FOR MEASURING AND DEMONSTRATING THE DEPTH OF DAMAGE

(71) Applicant: Manheim Investments, Inc., Atlanta, GA (US)

(72) Inventors: Thomas Gerard Berent, Murfreesboro, TN (US); Marc Erdreich Haegelin, Mount Juliet, TN (US)

(73) Assignee: MANHEIM INVESTMENTS, INC., Atlanta, GA (US)

( * ) Notice: Subject to any disclaimer, the term of this patent is extended or adjusted under 35 U.S.C. 154(b) by 369 days.

(21) Appl. No.: 13/893,459

(22) Filed: May 14, 2013

(65) Prior Publication Data

US 2014/0338209 A1 Nov. 20, 2014

(51) Int. Cl.
*G01B 3/28* (2006.01)

(52) U.S. Cl.
CPC ........................................ *G01B 3/28* (2013.01)

(58) Field of Classification Search
CPC .......................................................... G01B 3/28
USPC .............. 33/836, 203, 203.18, 286, 288, 293, 33/600
See application file for complete search history.

(56) References Cited

U.S. PATENT DOCUMENTS

| | | | | |
|---|---|---|---|---|
| 1,354,195 A * | 9/1920 | Jokubaitis | ............... | F16M 11/22 24/11 CC |
| 2,174,440 A * | 9/1939 | Foley | ......................... | 33/27.032 |
| 2,303,651 A * | 12/1942 | Mason | ................... | B23Q 17/22 33/836 |
| 2,388,252 A * | 11/1945 | Crane | ............................. | 33/485 |
| 2,484,298 A * | 10/1949 | Krahulec | ................... | 346/140.1 |
| 2,508,372 A * | 5/1950 | Carlson | ....................... | 242/379.2 |
| 2,529,764 A * | 11/1950 | Dufilho | .................. | G01C 17/00 206/38 |
| 2,547,990 A * | 4/1951 | Willms | ......................... | 294/65.5 |
| 2,606,530 A * | 8/1952 | Bodnar | ......................... | 401/211 |
| 2,625,585 A * | 1/1953 | Krouse | .................. | G01B 7/105 324/202 |
| 2,693,788 A * | 11/1954 | Spatz | ............................ | 211/69.1 |
| 3,168,889 A * | 2/1965 | Rubissow | ................ | B43K 5/04 401/152 |
| 3,513,554 A * | 5/1970 | Bickford | ........................ | 33/544 |
| 3,680,214 A * | 8/1972 | Quenot | ...................... | 33/501.03 |
| 3,785,739 A * | 1/1974 | Hodkin | .......................... | 401/52 |
| 4,392,305 A * | 7/1983 | Nix | ......................... | G01B 7/105 324/230 |
| 4,615,618 A * | 10/1986 | Bailey | ................ | G01B 11/2755 33/203.17 |
| 4,700,491 A * | 10/1987 | Rhea, Jr. | ......................... | 33/494 |
| 5,006,799 A * | 4/1991 | Pfanstiehl | .............. | G01B 7/105 324/230 |
| 5,351,414 A * | 10/1994 | Cogliano | ......................... | 33/719 |
| 5,430,951 A * | 7/1995 | Jacky | .............................. | 33/760 |
| 6,048,124 A * | 4/2000 | Kawabe | ............... | B43K 23/001 401/195 |
| 6,115,927 A * | 9/2000 | Hendrix | .......................... | 33/288 |
| 6,209,210 B1 * | 4/2001 | Stout | .............................. | 33/293 |

(Continued)

*Primary Examiner* — R. A. Smith
*Assistant Examiner* — Tania Courson
(74) *Attorney, Agent, or Firm* — Sutherland Asbill & Brennan LLP

(57) ABSTRACT

A dent measurement apparatus is presented. The dent measurement apparatus may be used in conjunction with documenting damage in objects, such as vehicles. Such damage may include dents, and the documentation process may include images or videos. To convey detail, it may be desirable to focus the images or videos closely on a damaged region and, in such cases, the dent measurement apparatus may help provide context for the size and depth of the damage. In particular, the dent measurement apparatus may removably attach to and extend from the damaged area such that the depth of damage may be determined relative to one or more markings on the body of the dent measurement apparatus.

14 Claims, 5 Drawing Sheets

(56) References Cited

U.S. PATENT DOCUMENTS

| | | | |
|---|---|---|---|
| D458,635 S * | 6/2002 | Boyle | D14/411 |
| 6,474,889 B2 * | 11/2002 | Kato | B43K 24/02 401/107 |
| 6,643,019 B1 * | 11/2003 | Jeanneret | G01C 15/105 33/286 |
| 6,823,603 B1 * | 11/2004 | Tindall | 33/471 |
| 6,846,122 B1 * | 1/2005 | Liao | B23K 8/003 401/131 |
| 7,024,788 B2 * | 4/2006 | Mason | 33/608 |
| 7,239,306 B2 * | 7/2007 | Fahraeus | G06F 3/03545 178/19.01 |
| 7,607,238 B2 * | 10/2009 | Kim et al. | 33/512 |
| 8,230,362 B2 * | 7/2012 | Couch | 715/852 |
| D669,896 S * | 10/2012 | Nakata | D14/411 |
| 8,875,408 B2 * | 11/2014 | Steffensen | 33/296 |
| 2003/0033722 A1 * | 2/2003 | Lanham | 33/374 |
| 2003/0131490 A1 * | 7/2003 | Johansson et al. | 33/608 |
| 2007/0204473 A1 * | 9/2007 | Dillon | 33/286 |
| 2012/0146957 A1 * | 6/2012 | Dunagan | 345/179 |
| 2012/0194484 A1 * | 8/2012 | Lehman | G06F 3/044 345/179 |
| 2013/0125407 A1 * | 5/2013 | Shapiro | 33/485 |
| 2014/0043245 A1 * | 2/2014 | Dowd et al. | 345/173 |
| 2014/0085248 A1 * | 3/2014 | Wang | G06F 3/03545 345/174 |

* cited by examiner

APPARATUS FOR MEASURING AND DEMONSTRATING THE DEPTH OF DAMAGE

BACKGROUND

In certain industries, including the automotive resale industry, it is important to determine and convey information about the condition of items being resold to potential offsite purchasers. In some industries, such information may be conveyed via websites, electronic messaging, catalogs, or other methods. In the automotive resale industry, such information may be conveyed by, for example, an electronic condition report available from Manheim, Inc. Such electronic condition reports may include textual information about the condition of a vehicle available for resale as well as images of portions of the vehicle or images of the entire vehicle.

SUMMARY

A dent measurement apparatus is disclosed. In one aspect, a dent measurement apparatus having an elongated body and first and second ends is presented. The dent measurement apparatus may have an adhering component at the second end, and one or more markings on the elongated body and at predetermined distances from the second end.

In another aspect, a dent measurement apparatus having a substantially hollow elongated body with first and second ends is presented. The dent measurement apparatus may have a magnet at the second end, and at least partially fit within the elongated body. The dent measurement apparatus may also include a plurality of markings along the elongated body at predetermined distances from the second end. At the first end, the dent measurement apparatus may include a writing tip, which may be coverable by a removable cap that has proximal and distal portions. The distal portion of the cap may include a touch screen writing tip.

Other aspects of a dent measurement apparatus may include relative position indicators postionable about the elongated body, width measuring devices, and telescoping elongated bodies. These and other aspects are further disclosed in the Detailed Description included herein.

BRIEF DESCRIPTION OF THE DRAWINGS

The detailed description is set forth with reference to the accompanying drawings, which are not necessarily drawn to scale. The same reference numbers in different figures indicate similar or identical items.

DETAILED DESCRIPTION

Illustrative embodiments will now be described more fully hereafter with reference to the accompanying drawings, in which some, but not all embodiments are shown. The disclosure may be embodied in many different forms and should not be construed as limited to the embodiments set forth herein; rather, these embodiments are provided so that this disclosure will satisfy applicable legal requirements. Like numbers refer to like elements throughout.

Figure 1:
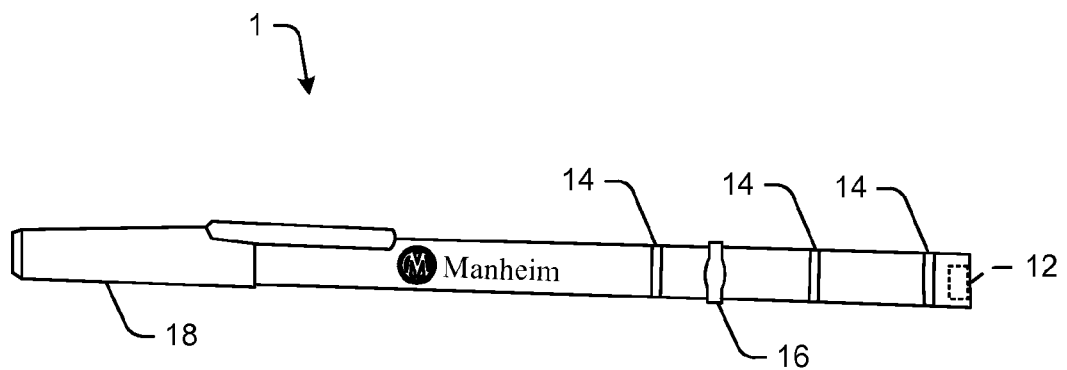
FIG. 1 is an illustrative example of one embodiment of a dent measurement apparatus.

One exemplary embodiment of the dent measurement apparatus 1 is shown in FIG. 1. As illustrated in this embodiment, the dent measurement apparatus 1 may comprise a body 10. The body 10 may be of various fixed lengths, or may be telescopic (e.g., an extendable rod). In some instances, the body may be roughly the size of a pen (approximately 7-8 inches long). The body 10 may be solid or tubular, and may have any cross-sectional shape including, as shown in the present embodiment, a hollow circular cross-section. For purposes of illustration, and not limitation, other cross sectional shapes could be polygons (quadrilateral shapes, parallelograms, pentagons, hexagons, etc.), ovals, star shapes, etc.

An adhering component, such as a magnet 12, may be included in one end of the body 10 so that the dent measurement apparatus 1 may be removably attached to an object. The magnet 12 may be mechanically fit within the body 10, adhesively attached to the body 10, pressed onto the body 10, or included in the body 10 as it is formed (e.g., the body may be extruded about the magnet 12). In some embodiments, it may be desirable to heat the body 10 such that its material expands and then the magnet 12 may be pushed into the body and held in place when the body 10 cools and contracts. Those of skill in the art will realize that the magnet 12 could also be attached to the body 10 in a plurality of other ways, and that the above examples are strictly illustrative and not limiting. Further, the magnet 12 may be entirely contained within the body 10, exposed on one or more surfaces, or exposed around the periphery of the body 10. In a preferred embodiment, the magnet 12 may emit a sufficiently strong field to hold the body 10 to an object in a variety of positions (e.g., protruding approximately horizontally from the surface of the object) when the body 10 is otherwise unsupported. Those of skill in the art will realize that in other embodiments, not shown, that the magnet 12 may be supplemented or replaced by other adhering components that help affix the dent measurement apparatus 1 to the dented object. For instance, in some embodiments, a suction cup or an adhesive substance might be affixed to the end of the body 10.

Along the length of the body 10, the dent measurement apparatus 1 may include a series of markings 14. These markings 14 may be printed or painted onto the body 10, pressed or formed into the body 10, or otherwise may include one or more rings around the circumference of the body 10, or only as lines/splines along a portion of the body 10. As illustrated in the embodiment of FIG. 1, the markings 14 may be located at fixed distances from the end of the body 10. For instance, the markings may be located ¼ inch, 1 inch, and 2 inches from the end of the body 10. Such distances may provide threshold depths that correspond to certain reconditioning or repair milestones, such as changes in the time required to complete the repair or depths at which a part must be replaced rather than repaired. For instance, each marking may represent a dent depth at which an additional hour of reconditioning labor will be required (i.e., if a dent is two markings deep, two hours of reconditioning labor will be required). Depending on the intended application of the dent measurement apparatus 1, it may be desirable to have more or fewer markings or markings at different increments (for instance, at 1 cm, 3 cm, and 5 cm) or regular increments (i.e., the body 10 could be ruled). It may also be desirable to have a limited number of markings so that the user and any viewers can easily distinguish each individual marking. In other embodiments, the markings could be different colors, colored bands of different widths, or perhaps colors that transition from one to the next, or combinations of the above. In this fashion, one might be able to tell both precisely where the markings are relative to the end of the body 10, and also roughly the relevant distances between the markings. In some embodiments, the markings may be labeled to indicate their distance from the magnet end of the body 10.

In some embodiments, it may be desirable to include a relative position indicator such as a slider 16 that may be adjusted along the length of the body 10. By adjusting the position of the slider 16 relative to the markings 14, specific distances of interest may be indicated. The slider 16 may include an elastic band, a flexible ring, an o-ring, a rigid piece, or any other element that may be fitted about or snapped to the body 10 such that it may move but still remain at the desired position. In other embodiments, the relative position indicator may be a piece that snaps to the body or adhesively sticks to the body to indicate a relevant distance of interest. The relative position indicator may be made from a material of contrasting color relative to the body 10 and the markings 14.

Figure 2:
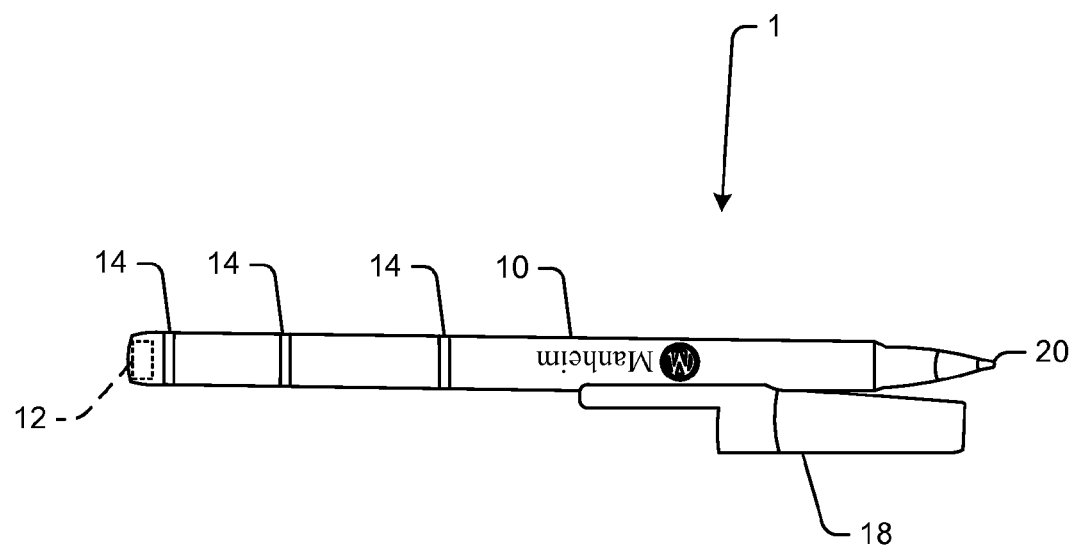
FIG. 2 is an illustrative example of an embodiment of a dent measurement apparatus with a cap removed.

In some embodiments, the body 10 may mate with a cap 18. This cap 18 may include a clip such that the dent measurement apparatus 1 may be clipped to an article of clothing, a clipboard, or the like. Further, in some embodiments, such as the one shown in FIG. 2, the cap 18 may be removable from the body 10. In such embodiments, the end of the body 10 from which the cap 18 is removed may include a writing tip 20. Such writing tips 20 may include, for example, ink pens, markers, pencils, or styluses. As such, the dent measurement apparatus 1 may provide a user with both a tool to indicate the depth of damage to an object as well as a tool for transcribing notes. In yet other embodiments, the body 10 may include a laser pointer. For instance, upon activation, the laser may be emitted from the end opposite the magnet 12. In yet other embodiments, a light, such as an LED, could be positioned at the end opposite the adhering component.

Figure 3:
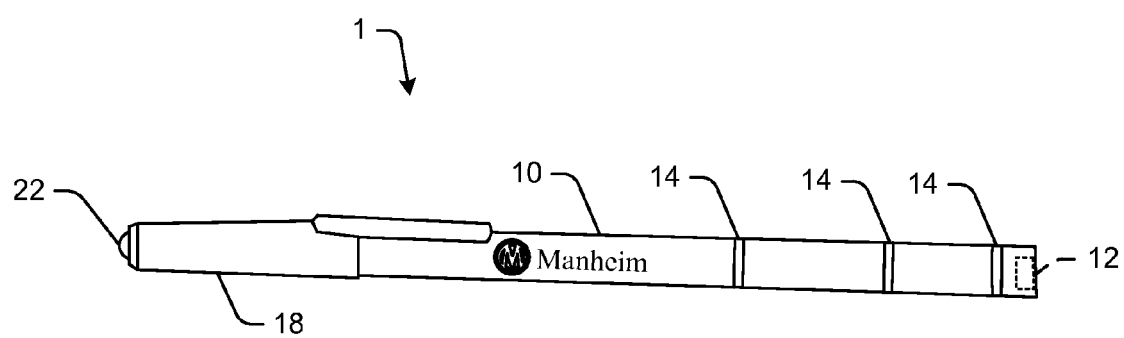
FIG. 3 is an illustrative example of an alternative embodiment of a dent measurement apparatus.

In embodiments such as the one illustrated in FIG. 3, the cap 18 may include a touch screen tip 22 suitable for use with touch screen devices such as mobile phones, smart phones, personal digital assistants, tablet computers, and the like. This may be particularly desirable in colder climates in which a user is likely to wear gloves while inspecting objects, yet may still need to record information in a touch screen device. Such touch screen tips 22 may include active styluses, such as electrode tips, and passive styluses. The stylus may be a roughly hemispheric, soft elastomeric piece, a rigid piece, or any other stylus known to those of skill in the art.

In many contexts, potential buyers of previously owned objects may be remotely located from those objects and may not have an opportunity or manner in which to inspect the items prior to a sale. In such scenarios, it is helpful to convey to potential buyers information regarding the condition of the item for sale. Such information may be conveyed both in writing, as well as by pictures and/or videos. While this Detailed Description focuses on examples within the automotive resale context, the present disclosure is not so limited. Instead, the dent measurement apparatus 1 and its applications could be broader. For instance, such an apparatus could be used in the context of inspecting and illustrating the condition of other vehicles, including recreational vehicles (RVs), boats, aircraft, motorcycles and scooters, all-terrain vehicles (ATVs), construction equipment, heavy-duty trucks, and work vehicles. Similarly, the dent measurement apparatus 1 could be used with other items as well, such as furniture, equipment, or any other item that is susceptible to damage by denting.

Figure 4:
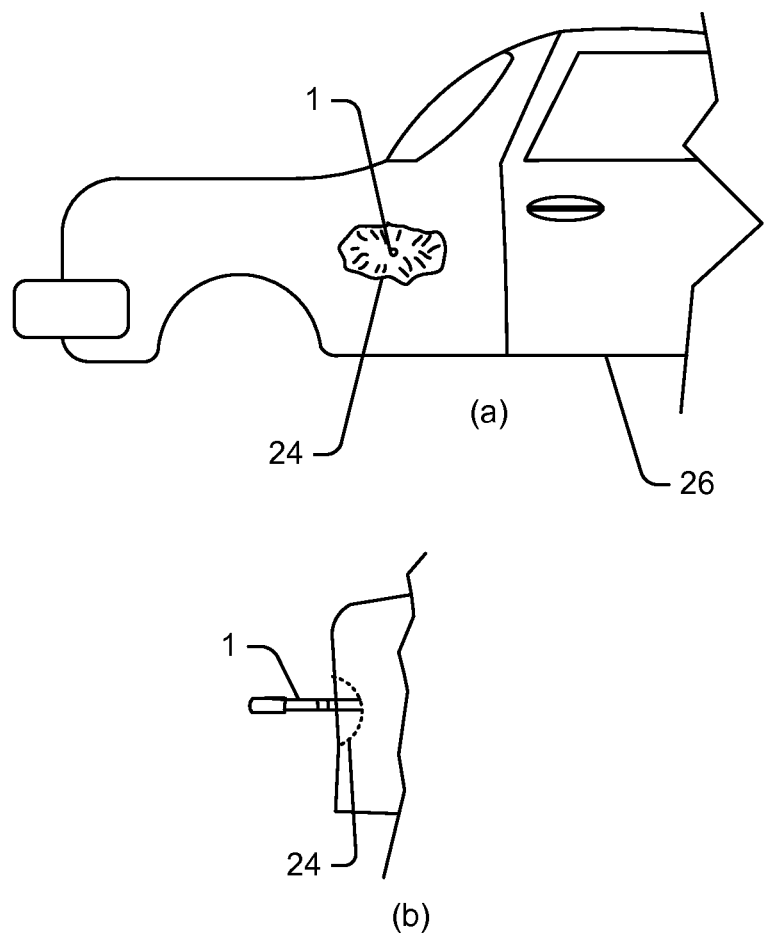
FIG. 4 is an illustrative example of an application of a dent measurement apparatus.

One exemplary use of the dent measurement apparatus 1 is illustrated in FIG. 4, which depicts a simplified illustration of a portion of a motor vehicle 26. The motor vehicle 26 includes at least one damaged area 24. As shown in views (a) and (b) of FIG. 4, the damaged area 24 may comprise a dented region. In such scenarios, the dent measurement apparatus 1 may be used substantially as shown in FIG. 4. The user may place the dent measurement apparatus 1 in the dent at the deepest point of damage. Because of the magnet 12, the dent measurement apparatus 1 will protrude from the dent substantially normal to the dent (or at least the surface on which the dent measurement apparatus 1 is placed). In this manner, the depth of the dent can be approximated using the markings relative to the adjacent, undented portions of the motor vehicle 26. Moreover, because the dent measurement apparatus 1 is magnetically and removably attached to the motor vehicle 26, the user may capture video and/or pictures of the damaged region. In images that are tightly focused on the damaged region, the dent measurement apparatus 1 may provide context as to the depth of the damage. Moreover, in embodiments that include a slider 16, the slider may be set at the approximate level of the original, undamaged body panel (i.e., roughly the level of the adjacent undamaged area). In this way, the user may capture images that help further convey to viewers the depth and extent of the damage. Further, the dent measurement apparatus 1 enables the user to convey this information without further damaging the motor vehicle 26.

Figure 5:
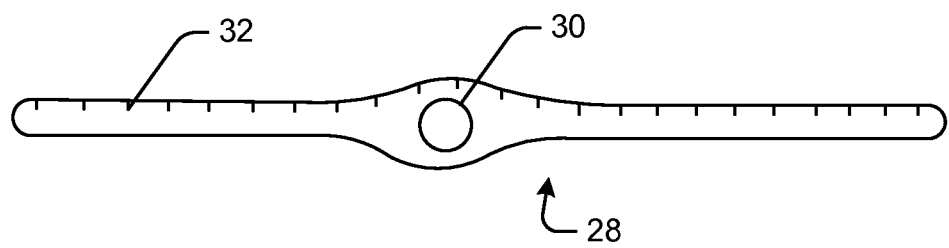
FIG. 5 is an illustrative example of a removable width measuring device that can be used with a dent measurement apparatus.

In other embodiments, it may be desirable to include other components that may be removably attached to the dent measurement apparatus 1. For example, in some embodiments, it may be desirable to have one or more removable width measuring devices 28 such as the one shown in FIG. 5. Such devices may allow the dent measurement apparatus 1 to also be used to indicate the width of the damaged area 24. In practice, such a width measuring device 28 may slidably attach to the dent measurement apparatus 1 by way of slidably fitting the central opening 30 about the dent measurement apparatus 1. Width indicators 32 may then indicate the size of the damaged area 24. Alternatively, such a width measuring device 28 might have a notch, for instance, a u-shaped notch that snaps about the body 10 of the dent measurement apparatus 1 instead of a central opening 30. In yet other embodiments, the width measurement device might be a portion of the body 10, which is configured to fold down at roughly right angles to the axis of the body itself Alternatively, perhaps the body has openings or recesses to which one or more width measuring pieces can inserted or fit.

While the above description was made in reference to a motor vehicle, not all objects that may include dents are made from a magnetic material. For instance, objects may be made from various plastics, composites, aluminum, and other non-magnetic materials. In such cases, it may be desirable to use a dent measurement apparatus that includes a suction cup or an adhesive tip instead of, or in addition to, the magnet. Alternatively, in some circumstances, a dent measurement apparatus might be held in position by placing a powerful magnet on the opposite side of the damaged piece of the object's skin (i.e., the magnet of the dent measurement apparatus is on one side of the skin, and a powerful magnet is on the other side, which creates a force to hold the dent measurement apparatus).

Although the disclosure has been described and illustrated with reference to specific illustrative embodiments thereof, it is not intended that the disclosure be limited to those illustrative embodiments. Those skilled in the art will recognize that variations and modifications can be made without departing from the true scope and spirit of the disclosure as defined by That which is claimed:

1. A dent measurement apparatus for measuring at least one dent in a vehicle, comprising:
    a fixed length elongated body having a first end and a second end;
    a writing tip disposed at the first end of the elongated body;
    an adhering component at the second end, the adhering component capable of generating sufficient attractive force to hold the otherwise unsupported elongated body to the vehicle within the at least one dent;
    a plurality of measurement markings disposed on the elongated body, wherein the plurality of measurement markings are non-uniformly spaced apart from one another at a predetermined distance from the second end to indicates a threshold between differing vehicle repair milestones;
    a relative position indicator slidably disposed along the elongated body to indicate in conjunction with the plurality of measurement markings a depth of the at least one dent; and
    a cap attachable to the first end or the second end of the elongated body.

2. The dent measurement apparatus of claim 1, wherein the adhering component further comprises a magnet.

3. The dent measurement apparatus of claim 2, wherein the magnet is at least partially included within the elongated body.

4. The dent measurement apparatus of claim 3, wherein the elongated body is hollow along at least a portion of its length and the magnet is pressed at least partially into the hollow portion of the elongated body.

5. The dent measurement apparatus of claim 1, wherein the plurality of measurement markings are spaced apart from one another at predetermined distances from the second end to indicate a threshold between differing vehicle repair milestones.

6. The dent measurement apparatus of claim 1, wherein a distal end of the cap comprises a touch screen tip.

7. The dent measurement apparatus of claim 1 further comprising a laser pointer, wherein a beam of the laser pointer is emitted from the first end.

8. The dent measurement apparatus of claim 1 further comprising a light positioned at the first end.

9. A dent measurement apparatus for measuring at least one dent in a vehicle, comprising:
    a fixed length elongated body having a first end and a second end, the elongated body having a hollow cross-section;
    a magnet at the second end, wherein the magnet is at least partially fit within the hollow cross section of the elongated body, and the magnet is capable of generating sufficient attractive force to hold the otherwise unsupported elongated body to the vehicle within the at least one dent;
    a plurality of circumferential markings on the elongated body, each of the markings being positioned at predetermined distances from the second end to indicate a threshold between differing vehicle repair milestones;
    a writing tip at the first end of the elongated body;
    a cap that has a proximal portion and a distal portion, wherein the proximal portion fits over the first end and about a segment of the elongated body; and
    a ring shaped relative position indicator positionable along a length of the elongated body, wherein the relative position indicator includes a width measuring device at least partially extending therefrom to indicate a width of the at least one dent.

10. The dent measurement apparatus of claim 9, wherein the distal portion of the cap further comprises a touch screen tip.

11. The dent measurement apparatus of claim 9, wherein the plurality of markings further comprise a series of colored bands.

12. The dent measurement apparatus of claim 11, wherein the colored bands transition from one color to another color over a distance between adjacent bands.

13. The dent measurement apparatus of claim 9, wherein the plurality of markings are spaced at unequal distances from one another.

14. A method for measuring at least one dent in a vehicle, comprising:
    attaching a dent measurement apparatus within the at least one dent, wherein the dent measuring apparatus comprises
        a fixed length elongated body having a first end and a second end,
        a writing tip disposed at the first end of the elongated body,
        an adhering component at the second end, the adhering component capable of generating sufficient attractive force to hold the otherwise unsupported elongated body to the vehicle within the at least one dent,
        a plurality of measurement markings on the elongated body,
        a relative position indicator slidably disposed along the elongated body to indicate in conjunction with the plurality of measurement markings a depth of the at least one dent, wherein the relative position indicator includes a width measuring device at least partially extending therefrom to indicate a width of the at least one dent, and
        a cap attachable to the first end or the second end of the elongated body; and
    sliding a relative position indicator along a length of the elongated body to indicate a depth of the at least one dent.

* * * * *